(12) United States Patent
Becker et al.

(10) Patent No.: US 7,766,093 B2
(45) Date of Patent: Aug. 3, 2010

(54) HYDRAULIC LIFT ROLLING BASKET STRUCTURE FOR A TILLAGE IMPLEMENT

(75) Inventors: Shawn Jeremy Becker, Ankeny, IA (US); Ryan Anthony Hackert, Oskaloosa, IA (US)

(73) Assignee: Deere & Company, Moline, IL (US)

( * ) Notice: Subject to any disclaimer, the term of this patent is extended or adjusted under 35 U.S.C. 154(b) by 607 days.

(21) Appl. No.: 11/511,724

(22) Filed: Aug. 29, 2006

(65) Prior Publication Data

US 2008/0066935 A1    Mar. 20, 2008

(51) Int. Cl.
    *A01B 49/02* (2006.01)
(52) U.S. Cl. ...................................... 172/133
(58) Field of Classification Search .............. 172/133, 172/145, 149, 151
    See application file for complete search history.

(56) References Cited

U.S. PATENT DOCUMENTS

| 3,692,120 | A | * | 9/1972 | Cline .......................... 172/151 |
| 4,176,721 | A | | 12/1979 | Poggemiller et al. |
| 4,220,211 | A | * | 9/1980 | Hake .......................... 172/618 |
| 4,306,732 | A | * | 12/1981 | Pettibone ................. 280/43.23 |
| 4,418,761 | A | | 12/1983 | Dietrich, Sr. et al. |
| 4,446,925 | A | | 5/1984 | Vachon |
| 4,537,262 | A | | 8/1985 | van der Lely |
| 4,554,977 | A | * | 11/1985 | Vachon ........................ 172/177 |
| 4,560,010 | A | * | 12/1985 | Weichel ....................... 172/177 |
| 4,600,060 | A | | 7/1986 | Winter et al. |
| 4,609,051 | A | * | 9/1986 | Good .......................... 172/266 |
| 4,700,785 | A | * | 10/1987 | Bartusek et al. ............. 172/705 |
| 5,234,060 | A | * | 8/1993 | Carter ......................... 172/413 |
| 5,474,135 | A | | 12/1995 | Schlagel |
| 5,797,460 | A | | 8/1998 | Parker et al. |
| 5,833,011 | A | * | 11/1998 | Boertlein .................... 172/149 |
| 6,068,061 | A | | 5/2000 | Smith et al. |
| 6,681,868 | B2 | | 1/2004 | Kovach et al. |
| 6,871,709 | B2 | | 3/2005 | Knobloch et al. |
| 6,896,068 | B2 | | 5/2005 | Dietrich, Sr. et al. |
| 6,926,093 | B1 | | 8/2005 | Fink et al. |

* cited by examiner

*Primary Examiner*—Thomas B Will
*Assistant Examiner*—Joel F Mitchell

(57) ABSTRACT

Rolling basket structure facilitating movement of the rolling device to and from a field-working position includes arm structure pivotally connected to the aft end of tine support members fixed to the rear of the implement frame. Hydraulic cylinders connected between the support members and the arm structure provides quick on-the-go disengagement of the rolling basket with the ground, for example, when wet or sticky ground conditions or the like are encountered. A cylinder lost motion connection facilitates movement of the baskets over ground irregularities and obstacles without operation of the cylinders.

12 Claims, 5 Drawing Sheets

HYDRAULIC LIFT ROLLING BASKET STRUCTURE FOR A TILLAGE IMPLEMENT

FIELD OF THE INVENTION

The present invention relates generally to agricultural tillage equipment and, more specifically, to a lift system for a rolling basket or rotary harrow.

BACKGROUND OF THE INVENTION

Numerous tillage implements include soil leveling devices attached at the aft end of the implement main frame. For example, in many combination implements a tine tooth harrow is suspended from the frame behind earthwork tools such as shovels or sweeps. To further reduce clod size and provide an improved seedbed, a rolling harrow or rolling basket structure is supported behind the harrow. A commonly utilized rolling basket assembly includes rearwardly projecting supports fixed to the frame and pivotally mounting rolling basket arms. The arms are biased downwardly by spring structure.

One problem with many of the implements with rolling baskets or similar trailing structures is the inability to quickly and easily lift the baskets out of ground engagement. Hand cranks and mechanical stops requiring the baskets to be moved upwardly against the spring bias are generally difficult and inconvenient to operate. Adjusting the baskets to same set position is also difficult. In certain conditions, such as operation in wet and sticky ground, the baskets must be lifted to prevent plugging and clogging of the baskets with mud. Field conditions can change from location to location within a single field, and therefore moving the baskets to and from a desired field-working position can be very time-consuming.

SUMMARY OF THE INVENTION

Rolling harrow or basket structure facilitating quick and easy movement of the rolling device to and from a desired field-working position includes arm structure pivotally connected to the aft end of tine support members fixed to the rear of the implement frame. Rolling baskets are rotatably mounted from the lower aft ends of the arm structure. A hydraulic cylinder or other actuator device is connected between the support members and the arm structure to pivot the arm structure upwardly about the connection at the aft end of the support members against the bias of down-pressure springs connected between the members and the arm structure. The cylinder facilitates quick removal of the rolling basket from the ground on-the-go, for example, when wet or sticky ground conditions or the like are encountered or when for any reason the operator desires to eliminate the rolling basket leveling and clod breaking function. A cylinder lost motion connection facilitates movement of the baskets over ground irregularities and obstacles.

These and other objects, features and advantages of the present invention will become apparent from the description below in view of the drawings.

DESCRIPTION OF THE PREFERRED EMBODIMENT

Figure 1:
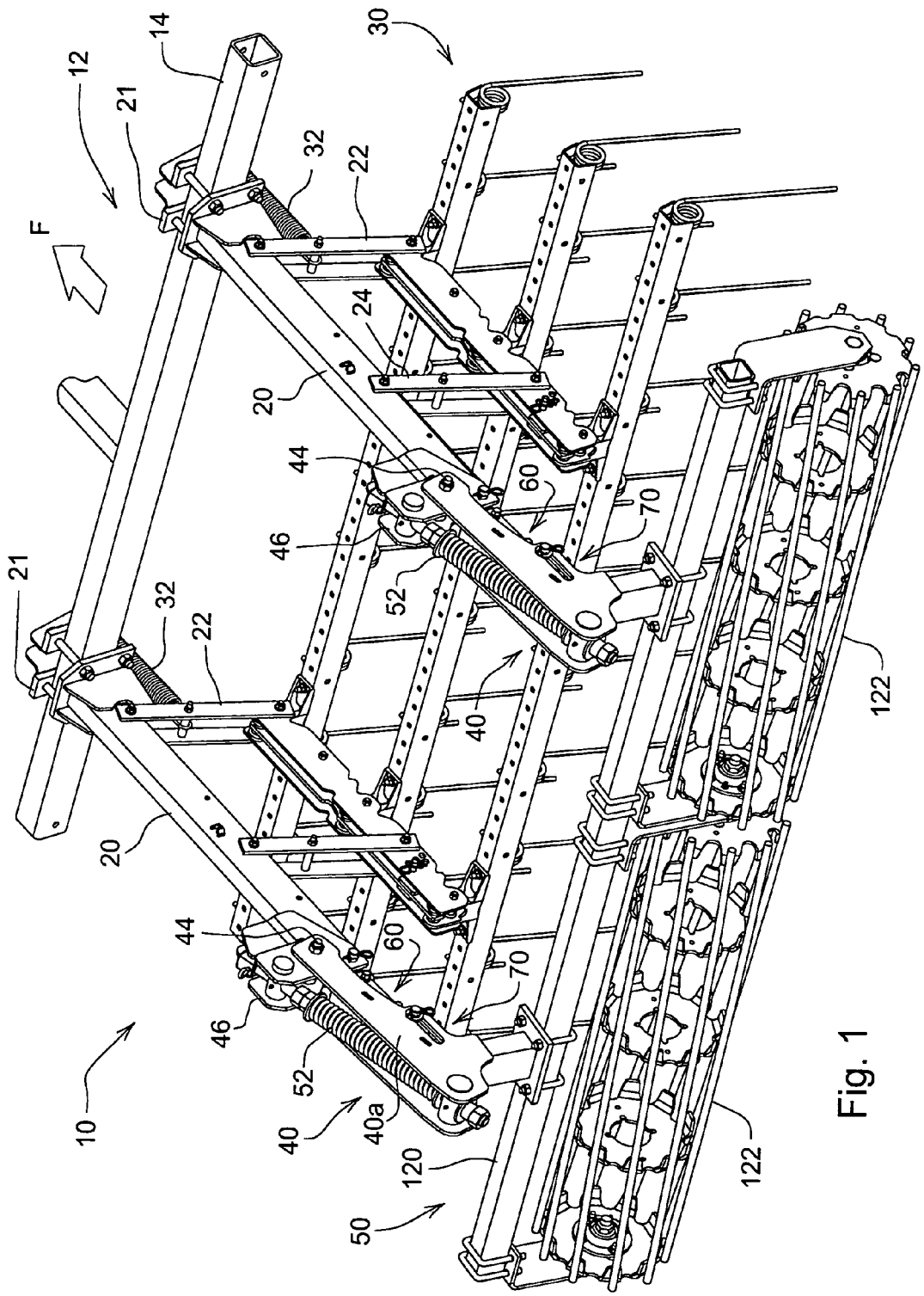
FIG. 1 is a perspective view of a portion of a tillage implement having trailing harrow and rolling basket structure.
Figure 2:
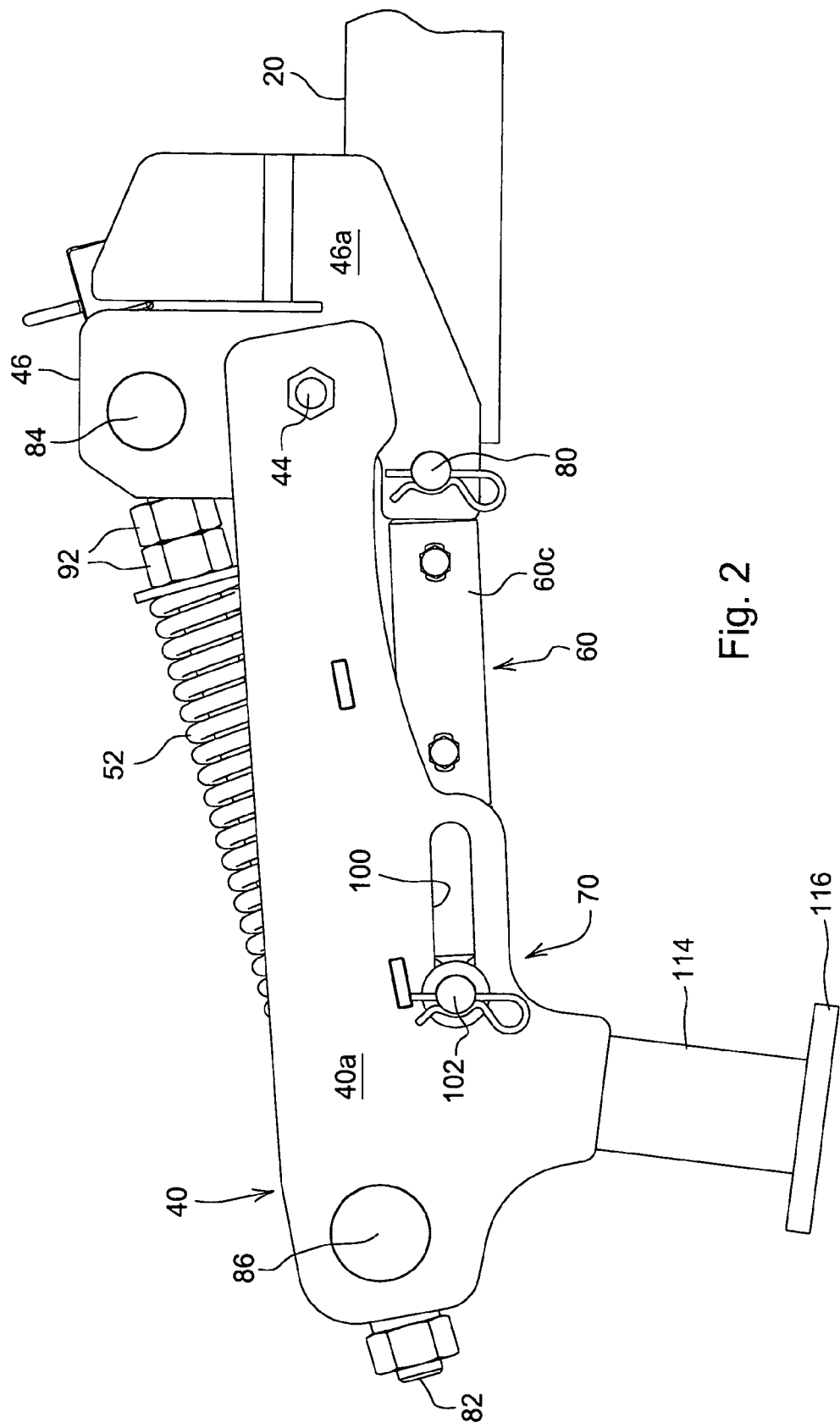
FIG. 2 is an enlarged side view of the pivotal connection area of the rolling basket.

Referring to FIG. 1, therein is shown a portion of an agricultural tillage implement 10 having a fore-and-aft extending main frame 12 with a rear frame member 14. The main frame 12 supports conventional tillage tools (not shown) such as sweeps, shovels and/or disks for forward movement (F) through the soil.

Fore-and-aft extending support members 20 are transversely spaced on the rear frame member 14 by brackets 21 connected to forward ends of the members 20. As shown, the support members 20 extend in cantilever fashion generally horizontally in the plane of the main frame 12. Forward and aft links 22 and 24 are pivotally connected at upper ends to the support members 20. The links 22 and 24 depend from the members 20 and support a tine harrow 30 or similar tool for engaging the ground behind the rear frame member 14. Springs 32 connected between the brackets 21 and the links 22 help bias the harrow 30 downwardly and forwardly into ground contact. The harrow 30 includes conventional adjustable angle tines 34 to engage the soil behind the tillage tools on the main frame 12.

Figure 3:
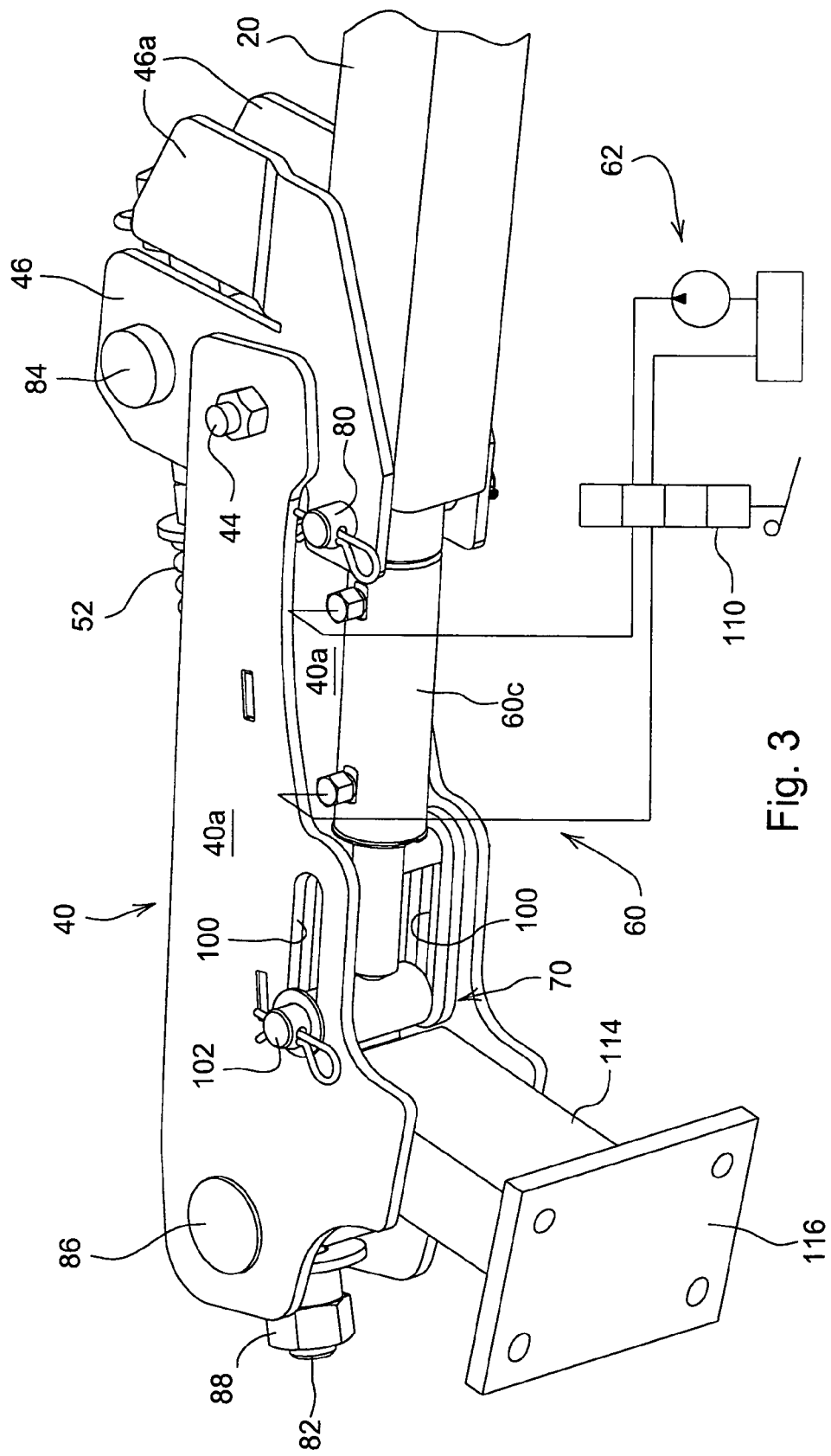
FIG. 3 is a bottom perspective view of the pivotal connection area of FIG. 2.
Figure 4:
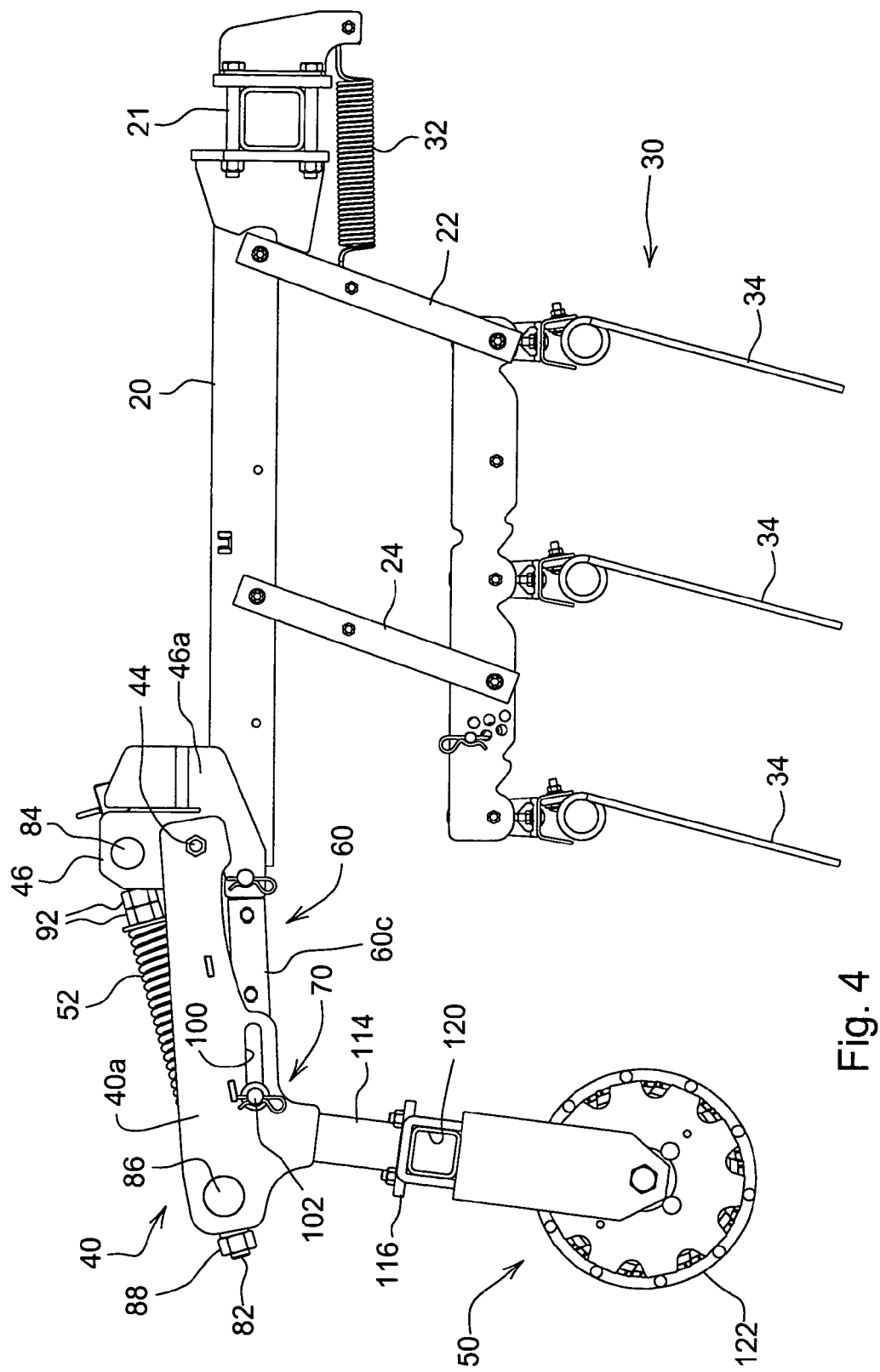
FIG. 4 is a side view of the rear portion of the implement in the field-working position.

The aft ends of the support members 20 are located above and slightly behind the aft extremity of the harrow 30. Rolling basket support arms 40 include forward ends pivotally connected by bolts 44 and arm brackets 46 to the aft ends of the support members 20. Rolling basket structure 50 is connected to aft ends of the support arms behind the harrow. The aft ends of the support arms 40 are biased downwardly towards the ground by the weight of the basket structure 50 and additionally by downpressure springs 52 connected between the brackets 46 and the support arms 40. Extendible and retractable hydraulic cylinder structure 60 is connected between the support members 20 and the rolling basket support arms 40 and is operable on-the-go by a controllable source of hydraulic pressure 62 (FIG. 3) on the towing vehicle to lift the rolling basket structure 50 relative to the main frame 12 and the harrow 30 against the bias (FIG. 5) and to lower the structure 50 back to the working position (FIG. 4). A lost motion connection 70 is located between the cylinder structure 60 and the rolling basket support arms 40 to facilitate pivoting of the rolling basket structure 50 upwardly against bias of the springs 52 when the basket structure 50 is in the working position (FIG. 4).

Each of the rolling basket arm brackets 46 includes upright sides 46a fixed to opposites sides of the corresponding end of the support member 20. The sides 46a extend forwardly to a pivotal connection 80 with the base end of a cylinder 60c. Uppermost ends of the sides 46a pivotally connect one end of a tension link 82 at location 84. The opposite or aft end of the tension link 82 is slidably received through a pivot 86 at the aft end of the support arm 40. A nut 88 threaded onto the aft end of the tension link 82 provides a downstop adjustment for the rolling basket assembly 50 (FIG. 4). The downpressure spring 52 is coiled over the tension link 82 and is compressed between the nuts 92 and the pivot 86.

The support arm 40 includes a pair of generally identical plates 40a transversely spaced on opposite sides of the bracket 46 and slotted at 100 to receive a pin 102 extending through the rod end of the cylinder 60c and define the lost motion connection 70. The slotted area at 100 is located forwardly and below the tension link pivot 86. The moment arm through which the spring 52 acts to bias the arm 40 downwardly decreases as the cylinder 60c is extended to pivot the arm 40 upwardly about the pivot 44 and compress the spring 52 (FIG. 5) to provide a more even down force over the pivot range of the arms 40. When the cylinder 60c is retracted (FIG. 4), the basket structure 50 lowers towards the lowermost position determined by the adjustment of the nut 88 on the tension link 82. The slotted area at 100 allows the arm 40 and the basket structure 50 to pivot upwardly against the bias of the springs 52 and the weight of the basket structure 50 varying soil conditions and uneven terrain without need to extend the cylinder 60c.

Figure 5:
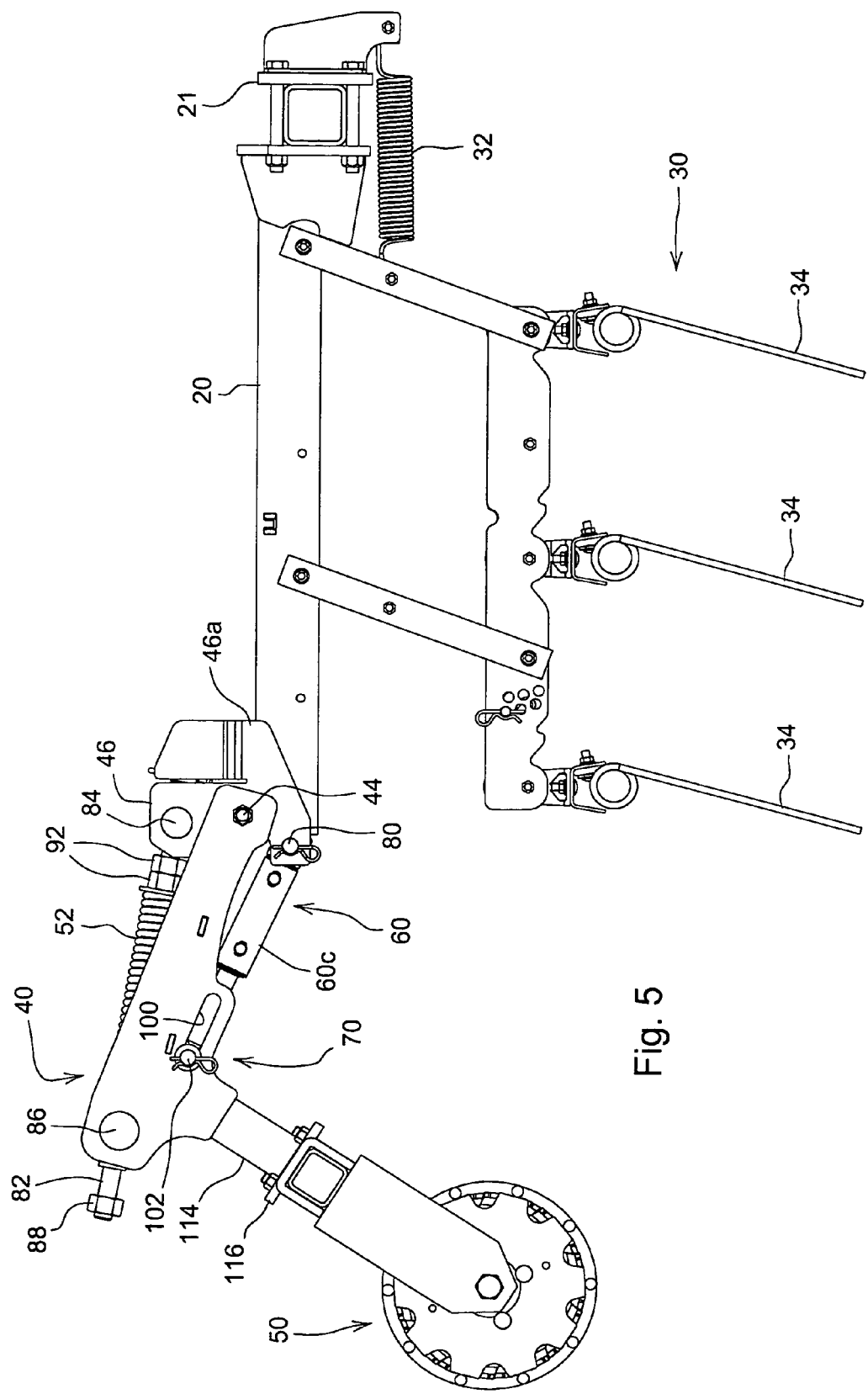
FIG. 5 is a view similar to FIG. 4 but showing the rolling basket in the lifted position.

As shown, the support arms 40 include downwardly directed arm sections 114 having lowermost apertured plate members 116. The plate members receive U-bolts securing a main transversely extending basket support beam 120 to the arms 40. Two or more rolling baskets 122 are connected to the support beam 120 for working the soil behind the harrow 30. When wet soil conditions are encountered or when for any other reason the operator desires to disengage the rolling basket structure 50, a selective control valve 110 at the operator station is moved to extend the cylinders 60c and lift the structure to the raised position (FIG. 5).

Having described the preferred embodiment, it will become apparent that various modifications can be made without departing from the scope of the invention as defined in the accompanying claims.

The invention claimed is:

1. An agricultural tillage implement having a fore-and-aft extending frame and adapted for forward movement over ground, the tillage implement including:
   fore-and-aft extending support members attached to an aft end of the frame;
   an earthworking tool depending from the support members;
   support arms having forward ends pivotally connected to aft ends of the support members;
   a rolling basket structure connected to aft ends of the support arms and biased downwardly into ground engagement for rotatably engaging the ground behind the frame;
   an extendible and retractable hydraulic cylinder;
   a connection attaching the cylinder between the support members and the support arms;
   wherein the cylinder is operable on-the-go to pivot the support arms and lift the rolling basket structure relative to the frame against the bias out of engagement with the ground to provide rolling basket structure lift independently of vertical movement of the frame; and
   including a lost motion connection between the cylinder and the support members facilitating pivoting of the support arms and movement of the rolling basket structure upwardly relative to the frame against the bias while the basket structure engages the ground.

2. The implement as set forth in claim 1 further including spring structure connected between the support members and the support arms and biasing the aft ends of the support arms downwardly, the hydraulic cylinder moving the aft ends of the support arms upwardly against the bias of the springs.

3. The implement as set forth in claim 1 wherein the earthworking tool comprises a spring tine harrow pivotally connected to the support members, and wherein the hydraulic cylinder is located rearwardly and above the tine harrow.

4. The implement as set forth in claim 2 wherein the spring structure includes a downstop adjustment for providing a lowermost vertical position of the rolling basket structure relative to the support members, and a slotted hydraulic cylinder connection located between the support members and the rolling basket structure permitting upward movement of the rolling basket structure when in the field-working position.

5. An agricultural tillage implement having a fore-and-aft extending frame with a rear frame member and adapted for forward movement over ground, the tillage implement including:
   fore-and-aft extending support members transversely spaced on the rear frame member;
   links pivotally connected to and depending from the support members and supporting a harrow engaging the ground behind the frame member;
   rolling basket support arms having forward ends pivotally connected to aft ends of the support members;
   rolling basket structure connected to aft ends of the support arms behind the harrow;
   wherein the aft ends of the support arms are biased downwardly towards the ground;
   actuatable hydraulic cylinder structure connected between the support members and the rolling basket support arms and operable on-the-go to pivot the support arms relative to the support members to lift the rolling basket structure relative to the harrow against the bias; and
   a lost motion connection located between the cylinder structure and the support arms to facilitate upward movement of the rolling basket structure independently of cylinder structure actuation.

6. The implement as set forth in claim 5 including bracket structure connected to the aft end of support members, the support arms pivotally connected to the bracket structure, a spring compressed between the bracket structure and the rolling basket support arms and providing downward bias on the rolling basket structure, wherein the hydraulic cylinder structure is connected to the bracket structure, and wherein the lost motion connection includes a slotted area in the bracket structure connecting the support members to the cylinder structure to facilitate upward movement of the rolling basket structure independently of cylinder structure operation.

7. The implement as set forth in claim 6 wherein including a downstop member connected between the bracket structure and the support arm.

8. The implement as set forth in claim 6 wherein the support arms comprise transversely spaced upright plates having slots defining the lost motion connection to the cylinder structure.

9. The implement as set forth in claim 8 wherein the cylinder structure includes a rod end pivotally connected to the upright plates at the slots.

10. The implement as set forth in claim 9 wherein the spring structure includes an aft spring end supported between the plates rearwardly of the slots.

11. The implement as set forth in claim 8 wherein the cylinder structure includes a cylinder supported between the plates.

12. The implement as set forth in claim 9 wherein the cylinder is supported below the spring within the plates and generally coextensive with the support arms.

* * * * *